United States Patent [19]
Marrero

[11] Patent Number: 5,858,111
[45] Date of Patent: Jan. 12, 1999

[54] AIRCRAFT MAINTENANCE APPARATUS AND METHOD OF MAINTAINING SAME

[76] Inventor: Lou Marrero, 992 Shalimar Point Dr., Shalimar, Fla. 32579

[21] Appl. No.: 786,829

[22] Filed: Jan. 21, 1997

[51] Int. Cl.$^6$ ............................... B08B 7/00; B64F 5/00; B60S 3/00
[52] U.S. Cl. .................................. 134/6; 15/53.1; 15/53.2
[58] Field of Search ..................................... 15/53.1, 53.2, 15/53.3, 97.1, 97.3; 134/6

[56] References Cited

U.S. PATENT DOCUMENTS

| | | |
|---|---|---|
| 3,533,395 | 10/1970 | Yaste . |
| 3,612,075 | 10/1971 | Cook . |
| 3,835,498 | 9/1974 | Arato . |
| 4,305,344 | 12/1981 | Baskett . |
| 4,378,755 | 4/1983 | Magnusson . |
| 4,634,084 | 1/1987 | Magnusson . |
| 4,654,087 | 3/1987 | Fujita ........................................ 15/53.3 |
| 5,060,887 | 10/1991 | Kean . |
| 5,104,068 | 4/1992 | Krilla . |
| 5,161,753 | 11/1992 | Vice et al. . |
| 5,318,254 | 6/1994 | Alexanian . |
| 5,320,121 | 6/1994 | Shaw et al. . |
| 5,354,014 | 10/1994 | Anderson . |
| 5,454,533 | 10/1995 | Grant et al. . |
| 5,458,299 | 10/1995 | Collins et al. . |
| 5,490,646 | 2/1996 | Shaw et al. . |

FOREIGN PATENT DOCUMENTS

| | | | |
|---|---|---|---|
| 0188796 | 11/1983 | Japan ....................................... | 15/53.2 |
| 0674729 | 7/1990 | Switzerland ............................ | 15/53.2 |
| 0 341 134 | 4/1989 | United Kingdom . | |

OTHER PUBLICATIONS

Nordic Aero brochure We Can Make Your Colours Shine Brighter Too (10 pages). (No Year).
"Large Aircraft Robotic Paint Stripping (LARPS) System and the High Pressure Water Process", USAF Contract No. F33615–91–C–5708, Mantech Technology Transfer Center, Oct. 8, 1992, pp. 11–1–11–21.

"Waterjet Systems, Inc.", United Technologies Pratt & Whitney, Aug., 1996.

"New Scientist", Robot arm elbows into the jet washing business, Nov. 24, 1990, vol. 1744.

"JAL", Japanese Airline Public Relations Department Press Release, Jun. 20, 1990.

"High Pressure Washing" by D.R. Egaas, Design Engineer—737/757 Flight Control Systems, Airliner/Apr.–Jun. 1988.

*Primary Examiner*—Randall E. Chin
*Attorney, Agent, or Firm*—Allen, Dyer, Doppelt, Milbrath & Gilchrist, P.A.

[57] ABSTRACT

An apparatus and methods are provided for performing maintenance procedures such as washing, cleaning, deicing, and painting to an aircraft. The apparatus according to an embodiment of the present invention preferably has a horizontally-extending mounting track and a track follower connected to the mounting track for following the mounting track. A maintenance tool support base preferably is connected to the track follower for supporting a maintenance tool thereon. An extending and retracting assembly is connected to the support base and to the track follower for extending the support base outwardly from the track follower and toward a portion of an aircraft and for retracting the support base inwardly from a portion of an aircraft and toward the track follower. An aircraft contour following assembly preferably is rotatably mounted to the support base and adapted for positioning adjacent an aircraft for following the contour of an aircraft to perform a maintenance procedure thereto. The aircraft contour following assembly includes at least one maintenance tool such as used for washing, cleaning, deicing, or painting an aircraft.

16 Claims, 8 Drawing Sheets

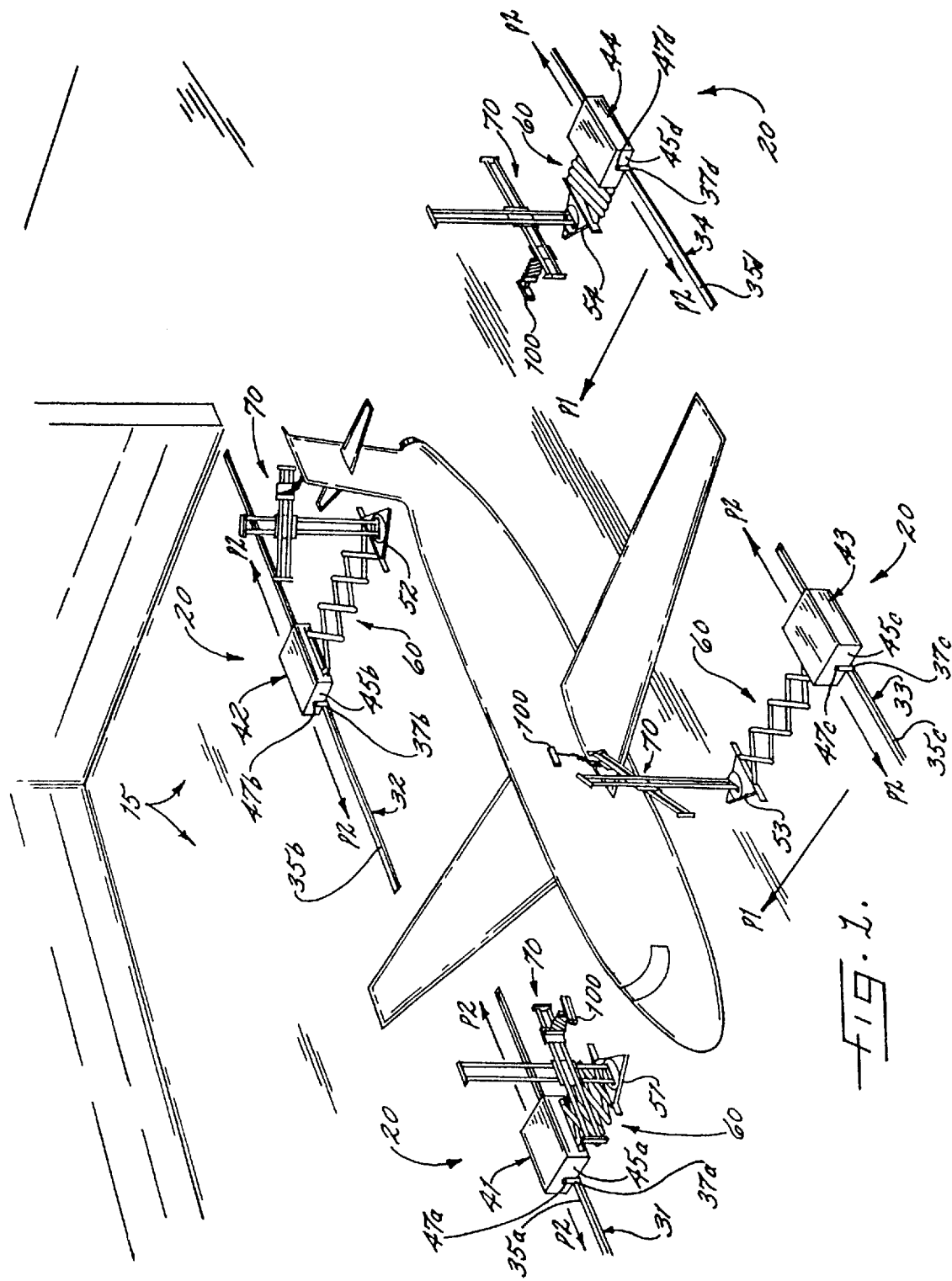

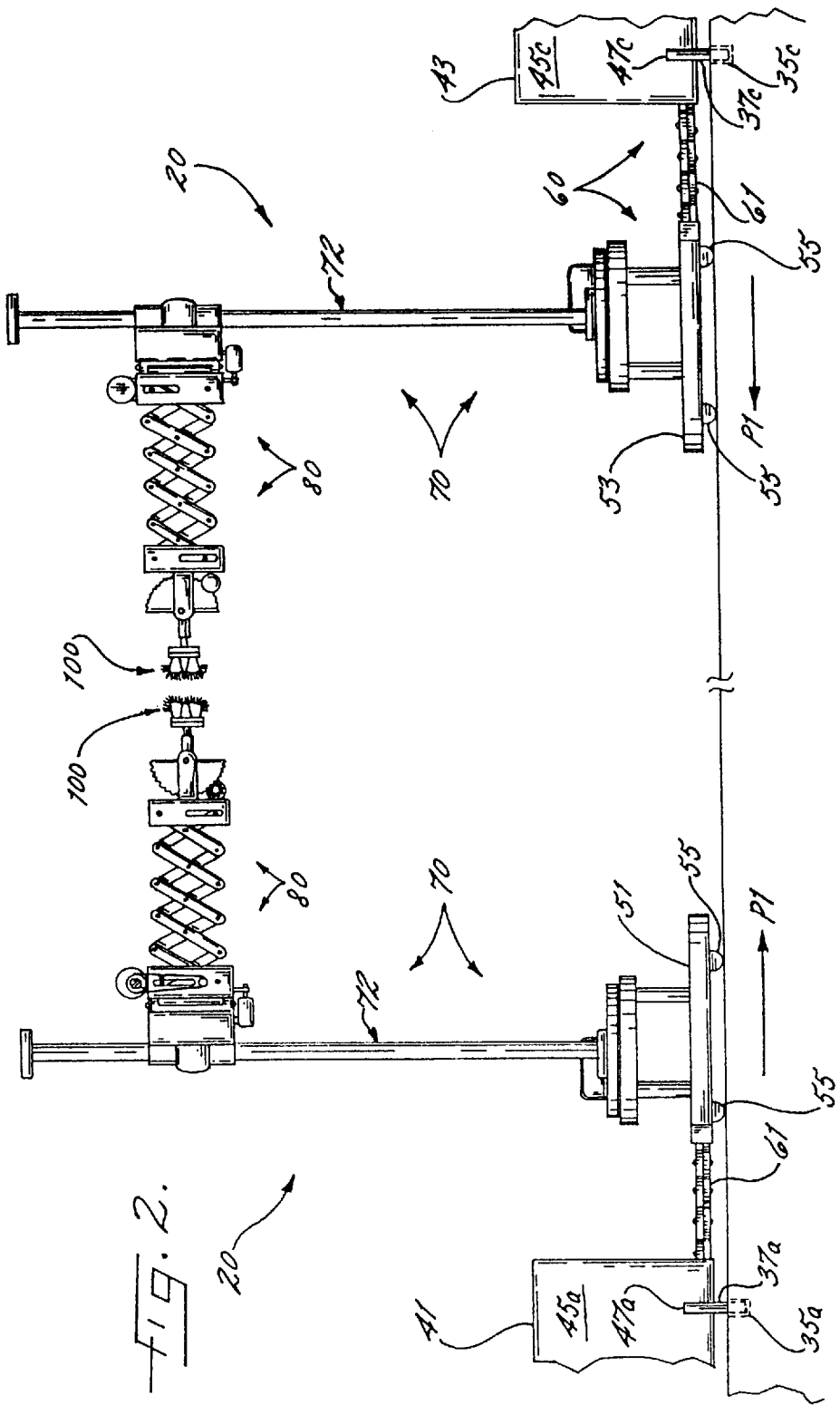

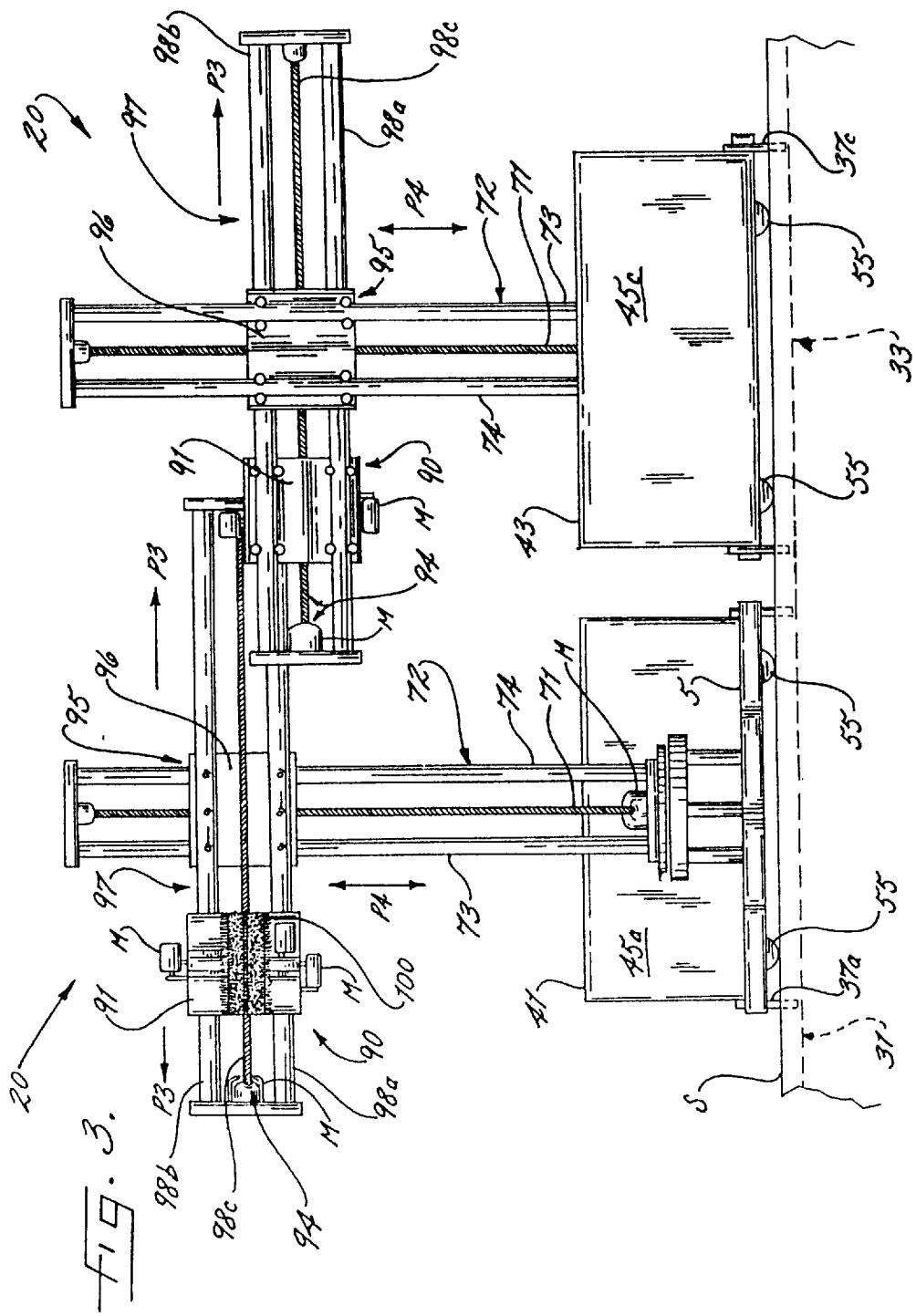

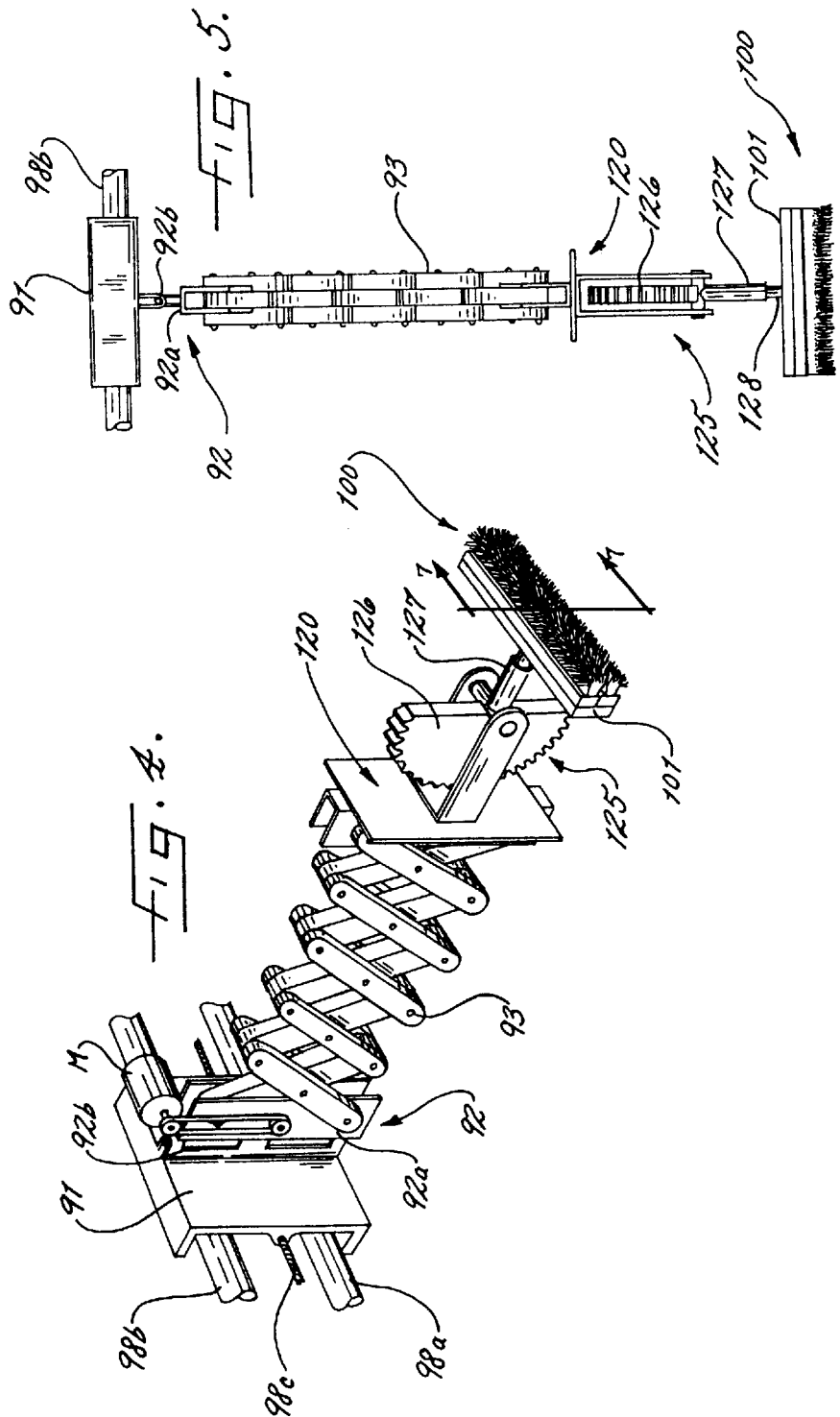

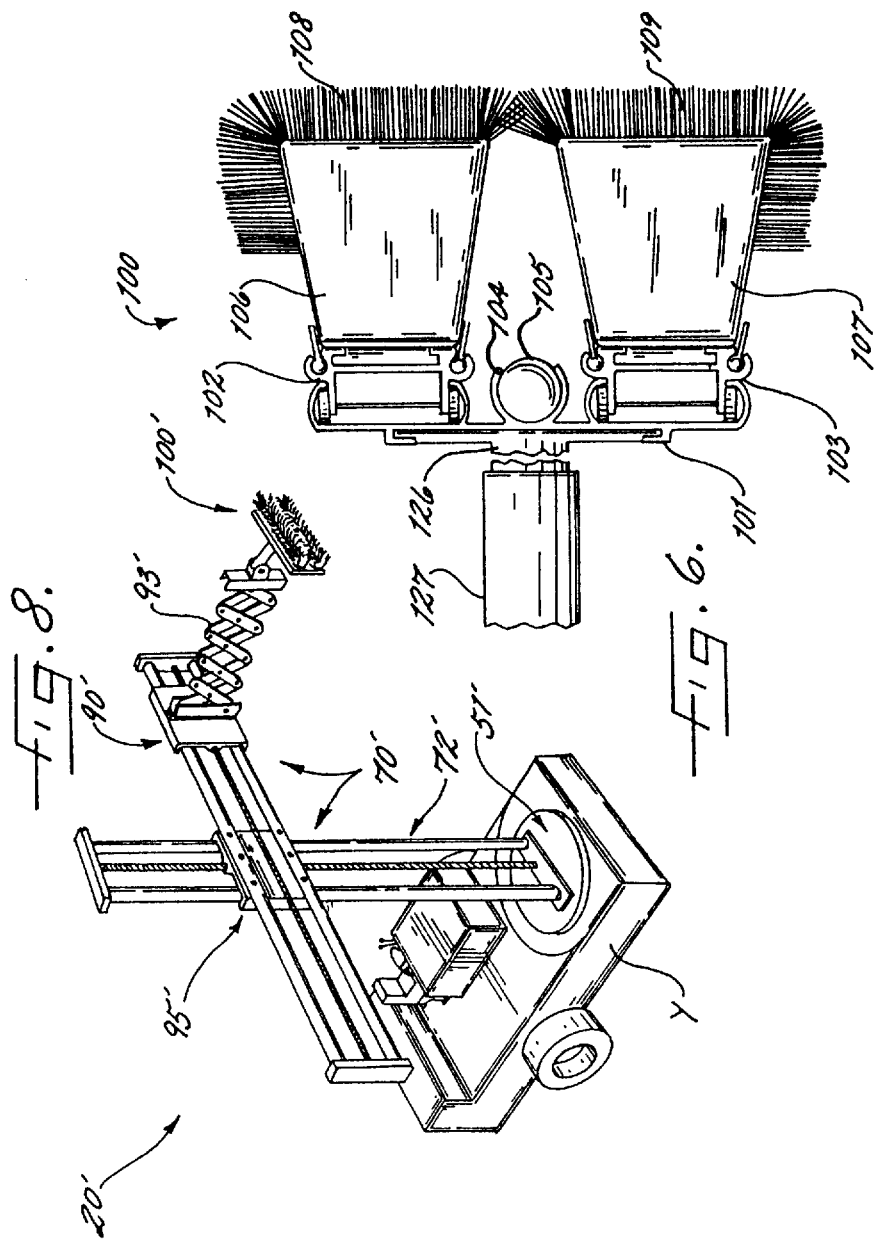

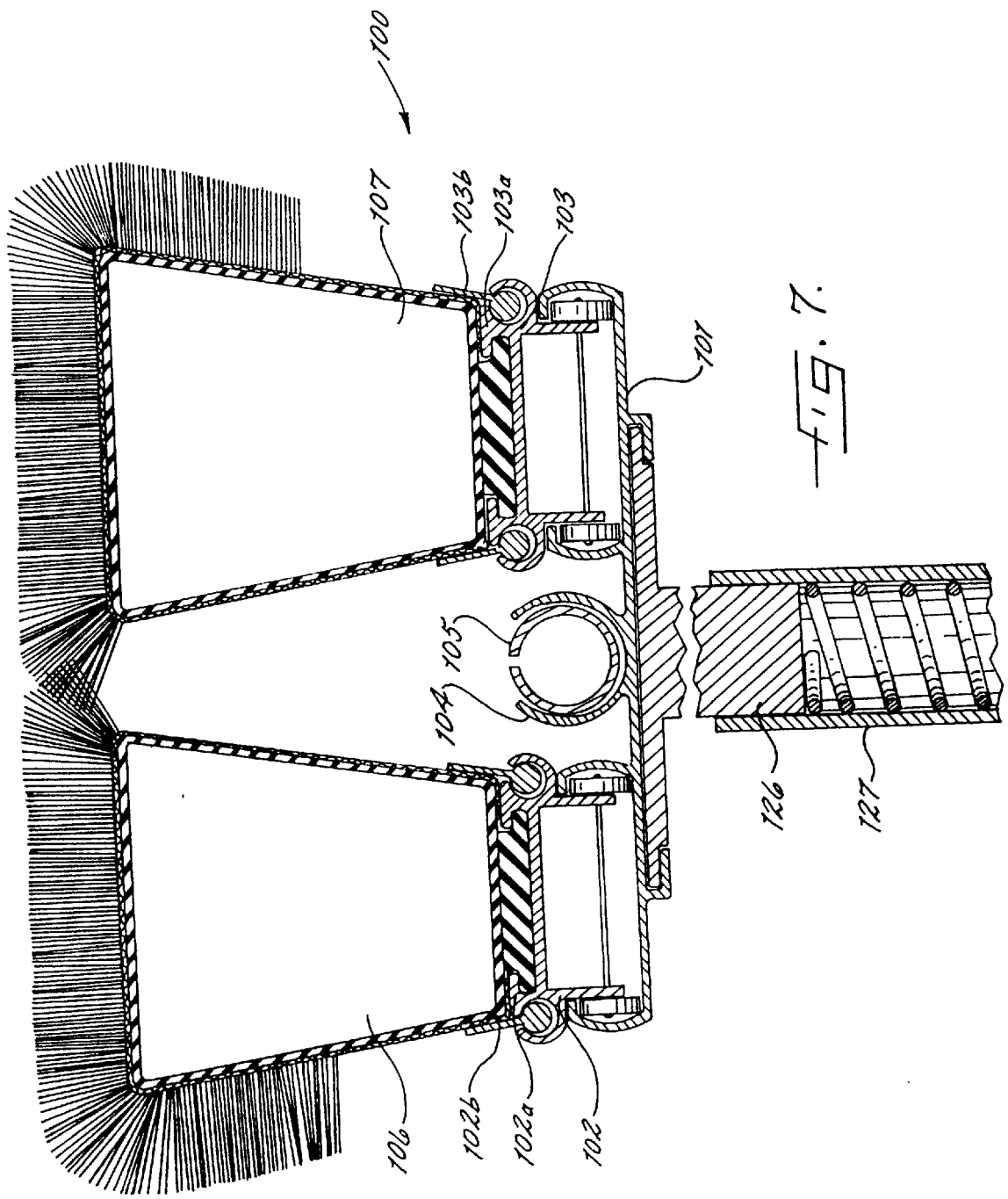

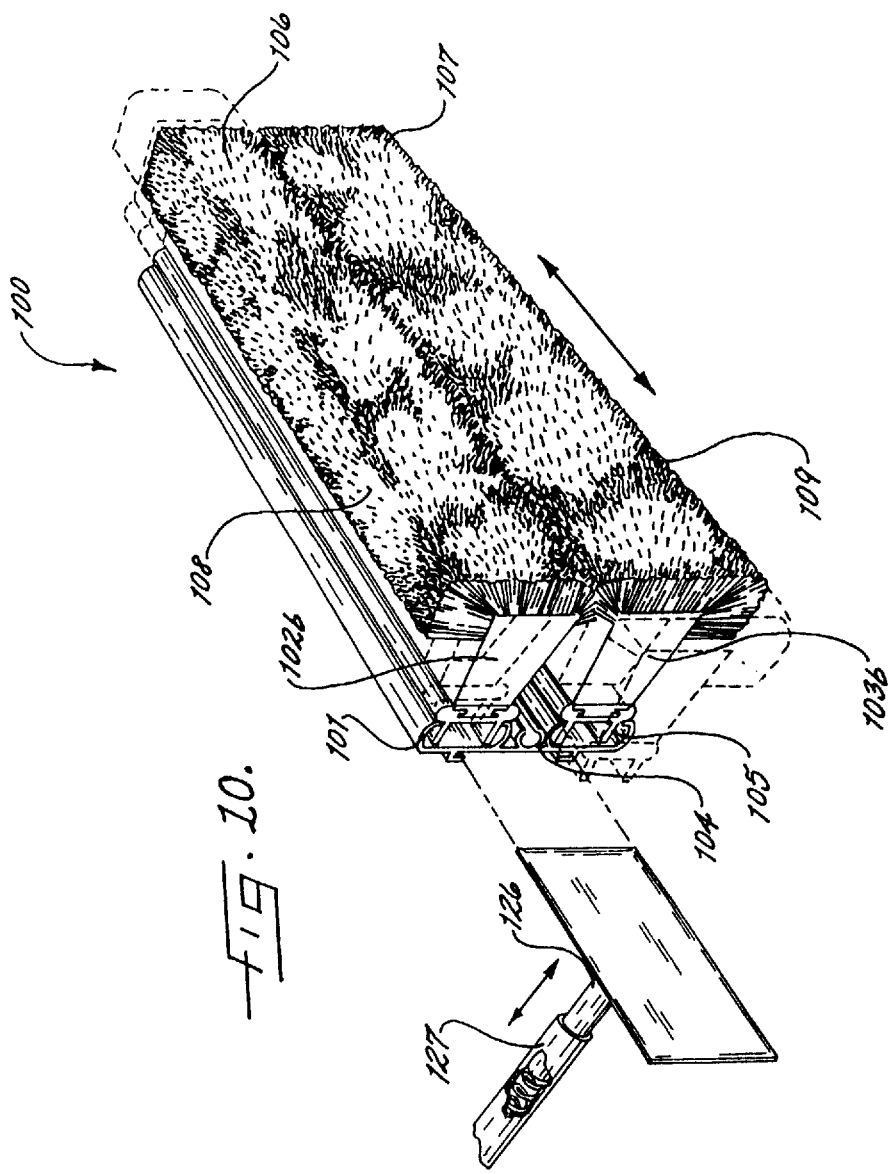

AIRCRAFT MAINTENANCE APPARATUS AND METHOD OF MAINTAINING SAME

FIELD OF THE INVENTION

The present invention relates to the field of aviation and, more particularly, to the maintenance of aircraft.

BACKGROUND OF THE INVENTION

Over the years, various aircraft maintenance equipment has been developed for maintaining various portions of an aircraft. This aircraft maintenance equipment has included washing, cleaning, deicing, painting, polishing, sanding, grinding, and/or other maintenance functions. Such systems conventionally provide an aircraft cleaning or painting apparatus which has a pair of spaced-apart tracks for positioning an aircraft therebetween and a track base slidably mounted to each track. An example of such a system can be seen in U.S. Pat. No. 5,458,299 by Collins et al. titled "Aircraft Deicing Apparatus". Other systems provide an aircraft cleaning or painting apparatus that has a boom pivotally mounted to a slidable support base. Examples of such an apparatus can be seen in U.S. Pat. No. 5,490,646 by Shaw et al. titled "Aircraft Maintenance Robot", U.S. Pat. No. 5,318,254 by Shaw et al. titled "Aircraft Maintenance Robot", and U.S. Pat. No. 3,835,498 by Arato titled "Craft Washing Plant". Still other systems provide overhead tracks under which an aircraft or other vehicle passes for providing maintenance such as painting, cleaning, or deicing. Examples of this type of system can be seen in French EPO-0341-134 Published Patent Application by Jonca and U.S. Pat. No. 5,320,121 by Alexanian titled "Vehicle Washing System".

These conventional aircraft maintenance systems, however, attempt to provide movement of a washing, cleaning, deicing, painting, polishing, sanding, or grinding apparatus by complex boom type systems which often require an expensive installation facility which includes extensive installation obstacles to overcome. These systems also often distribute the weight of the apparatus performing the maintenance functions either with the structure, i.e., building, hangar, garage, itself or at a substantial distance from the aircraft. This operational requirement, in turn, requires the extensive boom-type or robotic-type arms which extend outwardly from a base to perform the maintenance operation. These boom-type arms conventionally carry extensive electronics and can be quite expensive to manufacture. Other problems associated with these boom-type arms include the risk from damage to the long outwardly extending arms by moving aircraft, the requirement of complex and expensive control of the arm at a base a distance away from the aircraft, and the lack of effective control of the arm, e.g., to track the contour of the aircraft, and the maintenance tools adjacent the aircraft.

SUMMARY OF THE INVENTION

With the foregoing in mind, the present invention advantageously provides an apparatus and method for maintaining an aircraft that provides effective control of maintenance tools adjacent the aircraft. The apparatus and method of the present invention also advantageously track or follow the contour of the aircraft by providing the weight of the control of the maintenance tool adjacent the aircraft and reducing the problems and risks associated with the use of a long boom-type arm extending outwardly to provide the maintenance functions.

An apparatus for maintaining an aircraft according to an embodiment of the present invention preferably has at least a pair of spaced-apart, horizontally-extending mounting tracks adapted for positioning an aircraft therebetween and at least a pair of track followers connected to the at least a pair of mounting tracks for following the pair of mounting tracks along a predetermined path of travel. At least a pair of maintenance tool support bases are each respectively connected to the at least a pair of track followers for supporting a maintenance tool thereon. At least a pair of support base driving means are connected to the support base and to the track follower for driving each of the at least a pair of support bases outwardly from the track base and toward a portion of an aircraft positioned between the pair of spaced-apart mounting tracks and for driving each of the at least a pair of support bases inwardly from a portion of an aircraft and toward the mounting track. At least a pair of aircraft contour following means are each rotatably mounted to the at least a pair of support bases and adapted for positioning adjacent an aircraft for following the contour of an aircraft when positioned between the at least a pair of spaced-apart mounting tracks to perform a maintenance procedure thereto. Each of the at least a pair of aircraft contour following means includes at least one maintenance tool such as for washing, cleaning, deicing, painting, polishing, sanding, and/or grinding an aircraft.

An apparatus for maintaining an aircraft according to another embodiment of the present invention has a support base and a vertically-extending track rotatably mounted to the support base. First carriage means is positioned for carrying at least one maintenance tool thereon, and second carriage means is preferably slidably mounted to the vertically-extending support track and slidable connected to the first carriage means for carrying the first carriage means to perform a maintenance procedure on an aircraft. The second carriage means preferably includes a second carriage yoke following member slidably mounted to the vertically-extending track and a horizontally-extending track connected to the second carriage yoke following member in a cantilevered position on both sides of the second carriage base. The first carriage means is slidably mounted on the horizontally-extending cantilevered track.

In yet another embodiment of the present invention, the support base advantageously can be mounted to a movable vehicle, such as a dolly-truck or fork-lift type vehicle. The vehicle can then be driven by an operator positioned thereon, or remotely, adjacent an aircraft for following the contour of a portion of the aircraft as described in the embodiments above.

The present invention also includes methods of maintaining an aircraft. A method of maintaining an aircraft preferably includes following a horizontally-extending mounting track along a generally horizontal path of travel. A support base is extended outwardly from the mounting track and toward a portion of an aircraft and retracted inwardly from a portion of an aircraft and toward the mounting track. The contour of a portion of an aircraft is preferably followed with a maintenance tool mounted to the support base to perform a maintenance procedure to the aircraft.

Another method of maintaining an aircraft according to the present invention preferably includes rotating a vertically-extending track positioned adjacent a portion of an aircraft about a support base. At least one maintenance tool is carried on the vertically-extending track in a first generally vertical path of travel corresponding to the height of the aircraft and carried in a second generally horizontal path of travel corresponding to the lengthwise extent of a portion of the aircraft to perform a maintenance procedure to the aircraft.

An apparatus and methods according to the present invention advantageously allow the maintenance tool to travel in a generally vertical direction corresponding to the height of an aircraft, a generally horizontal direction corresponding to a lengthwise extent of an aircraft, and a third direction corresponding to the lateral extent of an aircraft. By having the substantial weight of the support base and the aircraft contour following assembly positioned adjacent the aircraft to be washed, cleaned, deiced, and/or painted, problems associated with the structural support systems for such a maintenance apparatus are greatly reduced or eliminated. The rotatable mounting of a vertically-extending track in combination with the above features also advantageously further allows the apparatus to follow a greater extent and more difficult contours, e.g., wings, tail, nose, lower portions of the fuselage, and/or engine mounts, of an aircraft.

Additionally, the rotatable mounting advantageously can increase productivity by performing near-simultaneous similar maintenance operations on a second aircraft located adjacent the first aircraft. The aircraft maintenance apparatus can be manufactured and used within a hangar or other housing at a relatively less expense and lower cost than conventional systems. Further, the apparatus according to the present invention advantageously can be readily retracted and positioned out of the path of travel of an aircraft within an existing hangar or other aircraft housing.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is an environmental perspective view of an aircraft maintenance system having a plurality of aircraft maintenance apparatus according to an embodiment of the present invention;

FIG. 2 is a side elevational view of an aircraft maintenance apparatus according to an embodiment of the present invention;

FIG. 3 is front elevational view of an aircraft maintenance apparatus according to an embodiment of the present invention;

FIG. 4 is a perspective view of a first carriage assembly of an aircraft maintenance apparatus according to an embodiment of the present invention;

FIG. 5 is a top plan view of a first carriage assembly of an aircraft maintenance apparatus according to an embodiment of the present invention;

FIG. 6 is a side elevational view of a maintenance tool of an aircraft maintenance apparatus according to an embodiment of the present invention;

FIG. 7 is a transverse sectional view of a maintenance tool of an aircraft maintenance apparatus taken along line 7—7 of FIG. 6 according to an embodiment of the present invention;

FIG. 8 is a perspective view of an aircraft maintenance apparatus according to another embodiment of the present invention;

FIG. 10 is a perspective view of an aircraft maintenance tool of an aircraft maintenance apparatus according to an embodiment of the present invention.

DETAILED DESCRIPTION

Figure 9:
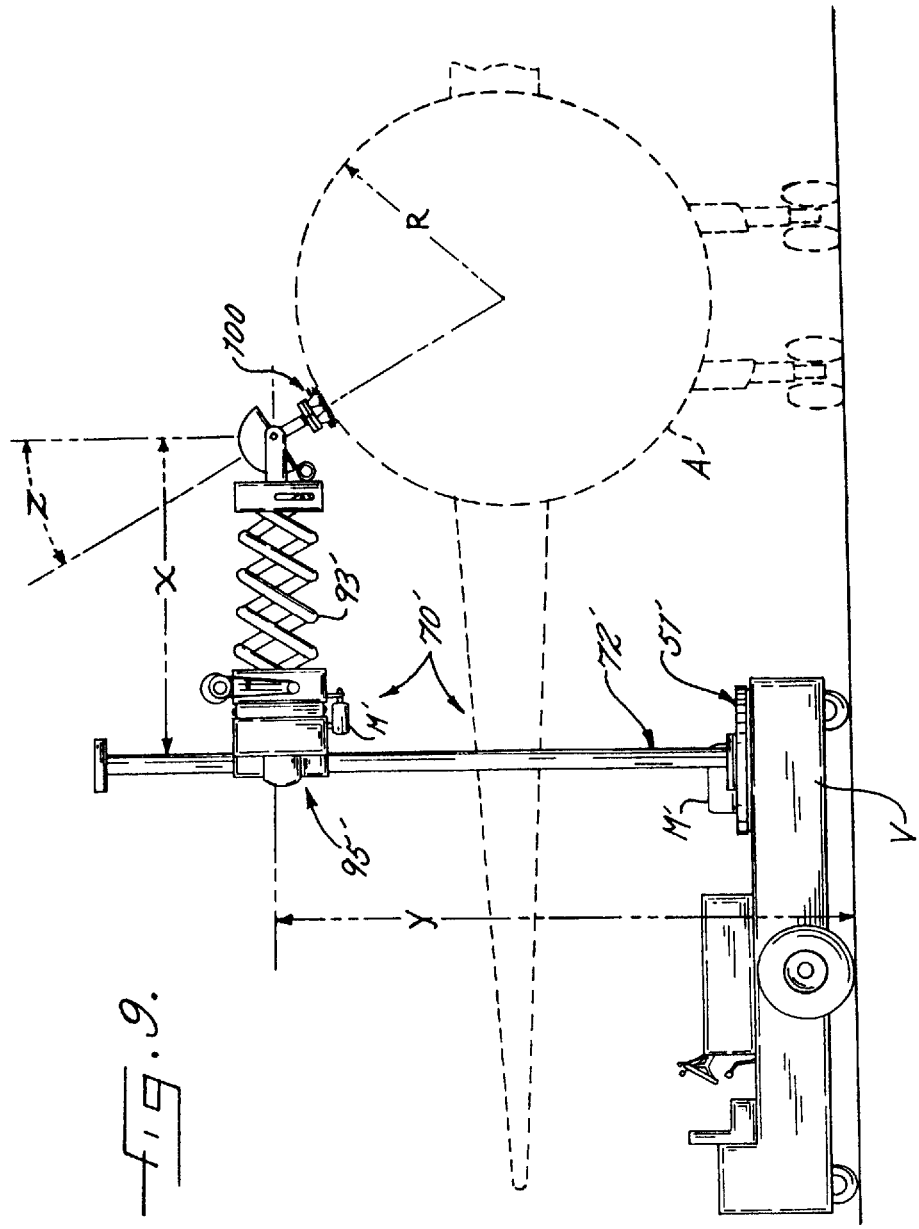
FIG. 9 is a side elevational view of an aircraft maintenance apparatus of FIG. 8 according to another embodiment of the present invention.

The present invention will now be described more fully hereinafter with reference to the accompanying drawings which illustrated preferred embodiments of the invention. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation are used to indicate similar elements in alternative embodiments.

FIG. 1 illustrates an environmental view of an aircraft maintenance system 15 which has a plurality of aircraft maintenance apparatuses 20 for maintaining an aircraft according to an embodiment of the present invention. The system as illustrated has at least a pair of spaced-apart, horizontally-extending mounting tracks 31, 32, 33, 34 adapted for positioning an aircraft A therebetween. This illustration, however, has four spaced-apart mounting tracks 31, 32, 33, 34. A track follower 41, 42, 43, 44 is connected to each of the mounting tracks 31, 32, 33, 34 for following the mounting tracks 31, 32, 33, 34 along a predetermined path of travel P2. The mounting tracks 31, 32, 33, 34 preferably are spaced-apart a large enough distance so that various sized aircraft can easily pass between the mounting tracks 31, 32, 33, 34. The mounting tracks 31, 32, 33, 34 preferably are mounted in ground or below the floor surface and within the confines of an aircraft hanger, as illustrated, which houses the maintenance system, e.g., cleaning, washing, etc. Like a conventional car wash, this configuration advantageously allows aircraft to pass through the hanger in a queuing system to have a maintenance operation performed thereon. As described above, and further herein, the apparatus 20 of the present invention can provide a less expensive and effective maintenance system for performing various maintenance operations with a single aircraft maintenance apparatus 20 that can readily be modified for each of these various maintenance operations.

In this illustration, each of the track followers 41, 42, 43, 44 of the aircraft maintenance system 15 has a main body 45a, 45b, 45c, 45d and a groove or channel 47a, 47b, 47c, 47d formed in and extending across the main body 45a, 45b, 45c, 45d. Each of the mounting tracks 31, 32, 33, 34, in turn, also has a main body 35a, 35b, 35c, 35d and a flange 37a, 37b, 37c, 37d connected to the main body 35a, 35b, 35c, 35d and extends upwardly and slidably engages the groove or channel 47a, 47b, 47c, 47d of the corresponding track follower 41, 42, 43, 44. A chain or cable drive assembly preferably drives the track followers 41, 42, 43, 44 in a plane generally parallel to the fuselage or main body of an aircraft A. It will be understood by those skilled in the art, however, that the mounting tracks 31, 32, 33, 34 can include a groove or channel recessed therein and the track follower 41, 42, 43, 44 can include a flange or other engaging member which extend downwardly into the groove or channel of the corresponding mounting track 31, 32, 33, 34.

A maintenance tool support base 51, 52, 53, 54 is respectively connected to each of the track followers 41, 42, 43, 44 for supporting at least one maintenance tool 100 thereon such as for washing, cleaning, deicing, painting, polishing, sanding, and/or grinding an aircraft A. The maintenance tool 100 illustrated herein advantageously is for cleaning or washing aircraft A as described further herein. It will be understood by those skilled in the art, however, that other maintenance tools such as for deicing, painting, polishing, sanding, and/or grinding an aircraft A can be used as well according to the present invention.

Each support base 51, 52, 53, 54 preferably includes a plurality of wheels 55 or other means for slidably moving or transporting the support base 51, 52, 53, 54 on a surface S, e.g., preferably a flat surface like a concrete slab or floor. The apparatus 20 according to the present invention, therefore, advantageously can be readily retracted and positioned out of the path of travel of an aircraft A within an existing hangar or other aircraft housing.

As illustrated, the support bases 51, 52, 53, 54 have a generally triangular shape and has generally rounded corners of the triangle. This triangular shape and rounded corners advantageously allows the support base 51, 52, 53, 54 to be positioned adjacent aircraft A, such as illustrated, reduces material necessary for construction of the support base 51, 52, 53, 54, and inhibits damage to aircraft or machinery which comes into contact with the support base 51, 52, 53, 54.

Support base driving means 60, e.g., an extending and retracting member 61 and at least one drive motor connected to a screw or drive shaft, is connected to each of the support bases 51, 52, 53, 54 and to each of the track followers 41, 42, 43, 44 for driving each of the support bases 51, 52, 53, 54 outwardly from the track follower 41, 42, 43, 44 and toward a portion of an aircraft A positioned between the at least a pair of spaced-apart mounting tracks 31, 32, 33, 34 and for driving each of the pair of support bases 51, 52, 53, 54 inwardly from a portion of an aircraft A and toward the track follower 41, 42, 43, 44 in a controlled manner. It will be understood by those skilled in the art that other types of drive assemblies of the support base driving means 60 such as hydraulic or pneumatic drive assemblies and various cam drive assemblies can be used as well according to the present invention. The support base driving means 60, as well as the positioning of the track followers 41, 42, 43, 44 preferably is controlled remotely by a controller connected to the support base driving means 60 and the track followers 41, 42, 43, 44. As understood by those skilled in the art, the controller preferably includes a user interface for interfacing with a user or system operator whom can direct the various operations of the aircraft maintenance apparatus 20 as described above and herein below.

Each of the support bases 51, 52, 53, 54 preferably extends and retracts in a first path of travel being defined as generally transverse to a main body of an aircraft A positioned between the pair of mounting tracks 31, 32, 33, 34, and each of the pair of track followers 41, 42, 43, 44 move along a second path of travel P2 being defined as generally parallel to the main body of the aircraft A positioned between the pair of mounting tracks 31, 32, 33, 34. The support base driving means 60 preferably includes extending and retracting arms 61 and one or more motors connected to the main body 45a, 45b, 45c, 45d of the track follower 41, 42, 43, 44 and to the extending and retracting arms 61 for driving the extending and retracting members or arms 61 inwardly and outwardly as illustrated in FIG. 1 along the first path of travel P1.

As best illustrated in FIGS. 1–3, a pair of aircraft contour following means 70, e.g., contour following assemblies, are each mounted to a respective one of the support bases 51, 52, 53, 54 and are adapted for positioning adjacent an aircraft A for following the contour of at least major portions of an aircraft A when positioned between the pair of spaced-apart mounting tracks 31, 32, 33, 34 to perform a maintenance procedure thereto. The aircraft contour following means 70 is preferably rotatably mounted to the support bases 51, 52, 53, 54, but as described further herein such a mounting is not necessary according to the present invention. Each of the pair of aircraft contour following means 70 has at least one maintenance tool 100, such as for washing, cleaning, deicing, painting, polishing, sanding, and/or grinding an aircraft, connected thereto.

Although the aircraft maintenance system 15 as illustrated in FIG. 1, includes a plurality of aircraft maintenance apparatuses 20 to increase the speed at which an aircraft A is cleaned, washed, deiced, or the like, only one of the aircraft maintenance apparatuses 20 can be used to perform a maintenance operation according to the present invention. Accordingly, as described further herein, the description will be directed primarily to only one aircraft maintenance apparatus 20.

As best illustrated in FIGS. 2–3, the aircraft contour following means 70 preferably has a vertically-extending track 72 rotatably mounted to the support base 51, 52, 53, 54 and maintenance tool 100 positioning means 80 movably mounted to the vertically-extending track for positioning the at least one maintenance tool closely adjacent a portion of an aircraft A. The maintenance tool positioning means 80 preferably includes first carriage means 90, e.g., a first carriage assembly, for carrying the at least one maintenance tool 100 thereon and second carriage means 95, e.g., a second carriage assembly, movably mounted to the vertically-extending track 72 for carrying the first carriage means 90 along a generally vertical path of travel P3.

The vertically-extending track 72 preferably has a pair of carriage guide members 73, 74, e.g., metal tubes, positioned in a spaced-apart relation for guiding the second carriage assembly 95 up and down the vertically-extending track 72. Second carriage driving means is connected to the second carriage assembly 95 for driving the second carriage assembly up and down the vertically-extending track 72. The second carriage driving means preferably includes a motor and a vertically-extending drive shaft 71 connected to the motor and positioned between and in a spaced-apart relation to the pair of carriage guide members 73, 74. The second carriage means 95 preferably is slidably mounted to the vertically extending track 72 and moves or is driven along a path of travel P4 being defined as a generally vertical direction generally corresponding to the height of an aircraft A positioned between the pair of mounting tracks 31, 32, 33, 34.

The first carriage means 90, as described further herein, preferably includes an aircraft fuselage cleaning tool 100, an aircraft tail cleaning tool, or a combination cleaning tool that can clean both the fuselage and the tail mounted thereto. An aircraft tail cleaning tool, for example, preferably has an assembly for cleaning the vertical fin and the horizontal stab. Such a tool configuration for cleaning only the tail of an aircraft can be accomplished by use of spaced-apart cleaning plates mounted to a tool fixture such as illustrated in the drawings. It will also be understood by those skilled in the art that a plurality of maintenance tools in combination can be connected to the first carriage means 90 according to the present invention.

The second carriage assembly 95 preferably has a second yoke following member 96 connected to the vertically-extending track 72 and the second carriage driving means for following the vertically-extending track 72 as the second carriage assembly 95 is driven along the generally vertical plane (see FIGS. 2–3). The second carriage assembly 95 also has a horizontally-extending track 97 connected to the second carriage yoke following member 96 in a cantilevered position on both sides of the base of the second carriage following member 96.

The first carriage means 90 is slidably mounted on the horizontally-extending cantilevered track 97 to thereby allow the first carriage means 90 to move in a generally horizontal plane P3. The first carriage assembly 90 preferably is mounted to the horizontally-extending cantilevered track 97 by a first carriage yoke following member 91 for following the cantilevered track 97 (see FIGS. 4–5). The horizontally-extending track 97 preferably has a pair of first carriage guide members 98a, 98b, e.g., horizontal tubes, positioned in a spaced-apart relation for guiding the first carriage assembly 90 along the horizontally-extending track 97. First carriage driving means 94 is connected to the first carriage assembly 90 for driving the first carriage assembly 90 along the horizontally-extending track 97. The first carriage driving means 94 preferably includes a motor and a horizontally-extending drive shaft 98c connected to the motor and positioned between and in a spaced-apart relation to the pair of carriage guide members 98a, 98b. In essence, the vertically-extending track 72 and the horizontally-extending track 97 advantageously form a T-type configuration that can provide large-area sweeps for a maintenance tool, e.g., a cleaning, washing, painting, or deicing tool, mounted thereon.

The first carriage assembly 90 also has pivoting means 92 connected to the first carriage yoke member 91 for pivoting the maintenance tool 100 in a generally horizontal plane. An extendable and retractable arm member 93 also is connected to the pivoting means 92 in a cantilevered configuration for extending outwardly away from and retracting inwardly toward the first carriage yoke member 91 and the pivoting means 92. The pivoting means 92 preferably includes a pivot sliding yoke member 92a connected to the first carriage yoke following member 91 and a pivot mount assembly 92b connected to the pivot sliding member 92a to thereby allow the arm member 93 to pivot in the horizontal plane. The extendable and retractable arm member 93 preferably has a following rod that slidably follows an elongate aperture formed in distal end portions of the sliding yoke member 92a. The pivoting means 92 preferably allows the arm member 93 to pivot about 180 degrees in a generally horizontal plane along the front side of the cantilevered track 97.

As best illustrated in FIGS. 4–5 and 10, a tool holding fixture 120 is preferably connected to the extendable arm member 93, and the maintenance tool 100 is connected to the tool holding fixture 120. The tool holding fixture 120 preferably is a cylindrical piston-like tool holding fixture 120 designed with the capability to provide an adjustable, constant spring force, e.g., pneumatic cushioning, on the tool 100 which thereby maintains the optimum contact pressure against the surface of the aircraft A upon which the tool 100 is operating or working. The tool holding fixture 120 of the first carriage means 90 includes tool pivoting means 125 for pivoting the at least one maintenance tool 100 along an arcuate contour of the outer surface of an aircraft A. The tool pivoting means 125 preferably has a geared or toothed plate member 126 pivotally mounted to the base of the tool holding fixture. A cylinder 127 is connected to the distal end of the plate member 126. A piston rod or shaft 128 has proximal end portions slidably mounted within the cylinder 127 and a distal end thereof connected to a rearward tool base 101 of the maintenance tool 100.

This configuration and structure of the aircraft contour following means 70 advantageously allows an aircraft A to be cleaned along its entire length and width. The combination of the vertically-extending track 72 and the horizontally-extending track, e.g., forming a tower-type structure, advantageously provide a means for reaching the height, length, and width of both the upper and lower exterior surfaces of an aircraft A, e.g., a commercial, private, or military aircraft to thereby perform a maintenance operation, e.g., cleaning, deicing, painting, thereon.

As best illustrated in FIGS. 6–7 and 10, the maintenance tool 100 used by the apparatus according to the present invention preferably forms aircraft cleaning means connected to the tool pivoting means 125 of the first carriage assembly 90 for cleaning an aircraft A. The aircraft cleaning means preferably has a tool base 101, a pair of spaced-apart cleaning brushes 106, 107 detachably connected to the tool base 101, and a cleaning fluid delivery head 105 detachably connected to the tool base 101 and positioned between the pair of spaced-apart cleaning brushes 106, 107. The tool base 101 includes a pair of spaced-apart cleaning brush yokes 102, 103 respectively adapted to receive the pair of cleaning brushes 106, 107 and a cleaning fluid delivery yoke 104 adapted to receive the cleaning fluid delivery head 105. The cleaning fluid delivery head 105 preferably delivers a cleaning fluid, e.g., water, detergent, antifreeze solution, or combination thereof, by adjustably selecting a solution, e.g., by a valve system, connected to a hose or fluid delivery system to which the cleaning delivery head 105 connects.

The pair of cleaning brush yokes 102, 103 of the tool base 102 preferably includes a tool platen 102a, 103a for receiving the cleaning brush 106, 107 and a retainer 102b, 103b for detachably retaining the cleaning brush. Each of the pair of spaced-apart cleaning brushes 106, 107 advantageously has a generally trapezoidal shape, and a plurality of bristles 108, 109 are respectively connected to the distal end of the brushes 106, 107. The proximal end of each of the trapezoidal-shaped cleaning brushes 106, 107 is detachably connected to the cleaning brush yoke 102, 103 and has a lateral extent shorter than the lateral extent of the distal end. The plurality of bristles 108, 109 of distal end portions of the pair of spaced-apart cleaning brushes 106, 107 advantageously overlap and contact each other as illustrated.

As best illustrated in FIG. 10, the washing and cleaning maintenance tool 100 of an aircraft maintenance apparatus 20 according to the present invention preferably has reciprocating capabilities. Each brush 106, 107 of the tool reciprocates back and forth as illustrated by the arrows. As understood by those skilled in the art, the reciprocating motion is initiated by a drive assembly, e.g., motors, cam drive, which separately drives each of the brushes 106, 107 at a relatively slow rate generally parallel to each other. The tool 100 thereby advantageously provides a gentle scrubbing action, e.g., no more than 60 strokes per minute, and the use of soft cotton or soft bristle brushes 106, 107 that move slowly along the fuselage or other portions of the aircraft A.

These type of brushes 106, 107 of the tool and the reciprocating system greatly inhibits any mechanical damage to the aircraft A. Also, unlike high pressure water delivery or cleaning systems, this tool 100 advantageously reduces concern from aircraft owners and operators that unwanted water can be forced into various crevices of an aircraft. This unwanted water, for example, can then freeze during flight and result in popping skin rivets or other problems. The softer brushes 106, 107 of the tool 100 also advantageously inhibits scratches to windows and windshields of an aircraft.

In yet another embodiment of an aircraft maintenance apparatus 20' of the present invention, as best illustrated in FIGS. 8–9, the rotatable support base 51', 52', 53', 54' advantageously can be mounted to a movable vehicle V, such as a dolly-truck or fork-lift type vehicle. The vehicle V can then be driven by an operator positioned thereon, or remotely, adjacent an aircraft A for following the contour of a portion of the aircraft A, e.g., X, Y, Z, and R movements as illustrated by the arrows, as described above and as illustrated in particular in FIG. 9. The remaining portions of this embodiment of an aircraft maintenance apparatus 20' according to the present invention are similar to those for the other embodiment described above and, accordingly, for conciseness will not be described in further detail herein. This embodiment of the apparatus 20' having a support base mounted to a vehicle V advantageously allows the vehicle operator to also operate the controller for controlling the motion and positioning of the aircraft contour following means 70'.

As illustrated in FIGS. 1–10, the present invention also includes methods of maintaining an aircraft A. A method of maintaining an aircraft A preferably includes following a horizontally-extending mounting track 31, 32, 33, 34 along a generally horizontal path of travel. A support base 51, 52, 53, 54 is extended outwardly from the mounting track 31, 32, 33, 34 and toward a portion of an aircraft A and retracted inwardly from a portion of an aircraft A and toward the mounting track 31, 32, 33, 34. The contour of a portion of an aircraft A is preferably followed with a maintenance tool 100 mounted to the support base 51, 52, 53, 54, e.g., preferably rotatably mounted, to perform a maintenance procedure to or upon the aircraft A. The method can also include positioning the maintenance tool 100 so as to abuttingly contact a portion of an aircraft A.

The step of following the contour of an aircraft A preferably includes carrying the maintenance tool 100 in a first vertical path of travel corresponding to the height of an aircraft A, a second horizontal path of travel corresponding to the lengthwise extent of a portion of an aircraft A, and a third path of travel corresponding to the lateral extent of a portion of an aircraft A. Additionally, during the step of carrying the tool 100 along the third path of travel, the tool 100 preferably also forms a path of travel corresponding to a tangent at the point of contact with the aircraft's outer surface.

The step of following the contour of a portion of an aircraft A can also advantageously include following the contour of portions of a tail of an aircraft A. This step of following the contour of a portion of an aircraft A can further include upwardly and downwardly pivoting the maintenance tool 100 along an arcuate contour of a portion of the outer surface of an aircraft A.

Another method of maintaining an aircraft A according to the present invention preferably includes rotating a vertically-extending track 72 positioned adjacent a portion of an aircraft A about a support base 51, 52, 53, 54. At least one maintenance tool 100 is carried on the vertically-extending track 72 in a first generally vertical path of travel corresponding to the height of the aircraft A and carried in a second generally horizontal path of travel corresponding to the lengthwise extent of a portion of the aircraft A to perform a maintenance procedure to the aircraft A.

This method can also include carrying the at least one maintenance tool 100 along a third path of travel corresponding to the lateral extent of a portion of the aircraft A and positioning the at least one maintenance tool 100 so as to abuttingly contact a portion of an aircraft A. Additionally, during the step of carrying the tool 100 along the third path of travel, the tool 100 preferably also forms a path of travel corresponding to a tangent at the point of abutting contact with the aircraft's outer surface.

Likewise, this step of following the contour of a portion of an aircraft A can additionally include following the contour of portions of a tail of an aircraft A. This step of following the contour of a portion of an aircraft A can further include upwardly and downwardly pivoting the maintenance tool 100 along an arcuate contour of a portion of the outer surface of an aircraft A. Also, as illustrated in FIGS. 8–9, this method can include rotatably mounting the vertically-extending track 72 to a vehicle V and positioning the vehicle V adjacent a portion an aircraft A.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. An apparatus for maintaining an aircraft, the apparatus comprising:

a support base;

a vertically-extending track rotatably mounted to said support base;

first carriage means for carrying at least one maintenance tool thereon; and second carriage means slidably mounted to said vertically-extending support track and slidably connected to said first carriage means for carrying said first carriage means to perform a maintenance procedure on an aircraft.

2. An apparatus as defined in claim 1, wherein said second carriage means moves along a path of travel being defined as a generally vertical direction generally corresponding to the height of an aircraft.

3. An apparatus as defined in claim 2, wherein said at least one maintenance tool of said first carriage means includes either an aircraft fuselage cleaning tool or an aircraft tail cleaning tool mounted thereto.

4. An apparatus as defined in claim 2, wherein said second carriage means includes a carriage track, and wherein said first carriage means further includes a carriage yoke following member connected to said carriage track of said second carriage means for following said carriage track, pivoting means connected to said carriage yoke following member for pivoting the at least one maintenance tool in a generally horizontal plane, an arm connected to said pivoting means for extending outwardly away from and inwardly toward said carriage yoke following member and said pivoting means, and a tool holding fixture connected to said extendable arm, the at least one maintenance tool being connected to said tool holding fixture.

5. An apparatus as defined in claim 4, wherein said tool holding fixture of said first carriage means includes tool pivoting means for pivoting the at least one maintenance tool along an arcuate contour of the outer surface of an aircraft.

6. An apparatus as defined in claim 5, wherein the at least one maintenance tool comprises aircraft cleaning means connected to said tool pivoting means for cleaning an aircraft, said aircraft cleaning means having a tool base, a pair of spaced-apart cleaning brushes detachably connected to said tool base, and a cleaning fluid delivery head detachably connected to said tool base and positioned between said pair of spaced-apart cleaning brushes.

7. An apparatus as defined in claim 6, wherein said tool base includes a pair of spaced-apart cleaning brush yokes respectively adapted to receive said pair of cleaning brushes and a cleaning fluid delivery yoke adapted to receive s aid cleaning fluid delivery head.

8. An apparatus as defined in claim 7, wherein each of said pair of cleaning brush yokes includes a tool platen for receiving the cleaning brush and a retainer for detachably retaining the cleaning brush, and wherein each of said pair of spaced-apart cleaning brushes has a generally trapezoidal shape and a plurality of bristles connected to the distal end thereof, the proximal end of said trapezoidal-shaped cleaning brush being detachably connected to said cleaning brush yoke and having a lateral extent shorter than the lateral extent of the distal end so that said plurality of bristles of distal end portions of said pair of spaced-apart cleaning brushes overlappingly contact each other.

9. An apparatus as defined in claim 1, wherein said support base is connected to a vehicle.

10. An apparatus as defined in claim 1, wherein said second carriage means comprises a yoke follower connected to said vertically-extending track for following said vertically-extending track along a generally vertical plane and a horizontally-extending track connected to said yoke follower and said first carriage means to thereby allow said first carriage means to move in a generally horizontal plane.

11. A method of maintaining an aircraft, the method comprising:

rotating a vertically-extending track positioned adjacent a portion of an aircraft about a support base;

carrying at least one maintenance tool on the vertically-extending track in a first generally vertical path of travel corresponding to the height of the aircraft; and carrying the at least one maintenance tool in a second generally horizontal path of travel corresponding to the lengthwise extent of a portion of the aircraft to perform a maintenance procedure to the aircraft.

12. A method as defined in claim 11, further comprising positioning the at least one maintenance tool so as to abuttingly contact a portion of an aircraft.

13. A method as defined in claim 12, further comprising carrying the at least one maintenance tool along a third path of travel corresponding to the lateral extent of a portion of the aircraft.

14. A method as defined in claim 13, further comprising following the contour of portions of a tail of an aircraft.

15. A method as defined in claim 11, further comprising upwardly and downwardly pivoting the at least one maintenance tool along an arcuate contour of a portion of the outer surface of an aircraft.

16. A method as defined in claim 11, further comprising rotatably mounting the vertically-extending track to a vehicle and positioning the vehicle adjacent a portion an aircraft.

* * * * *